Feb. 14, 1928.  1,659,549
I. F. KINNARD ET AL
ELECTRICAL MEASURING INSTRUMENT
Filed July 12, 1926
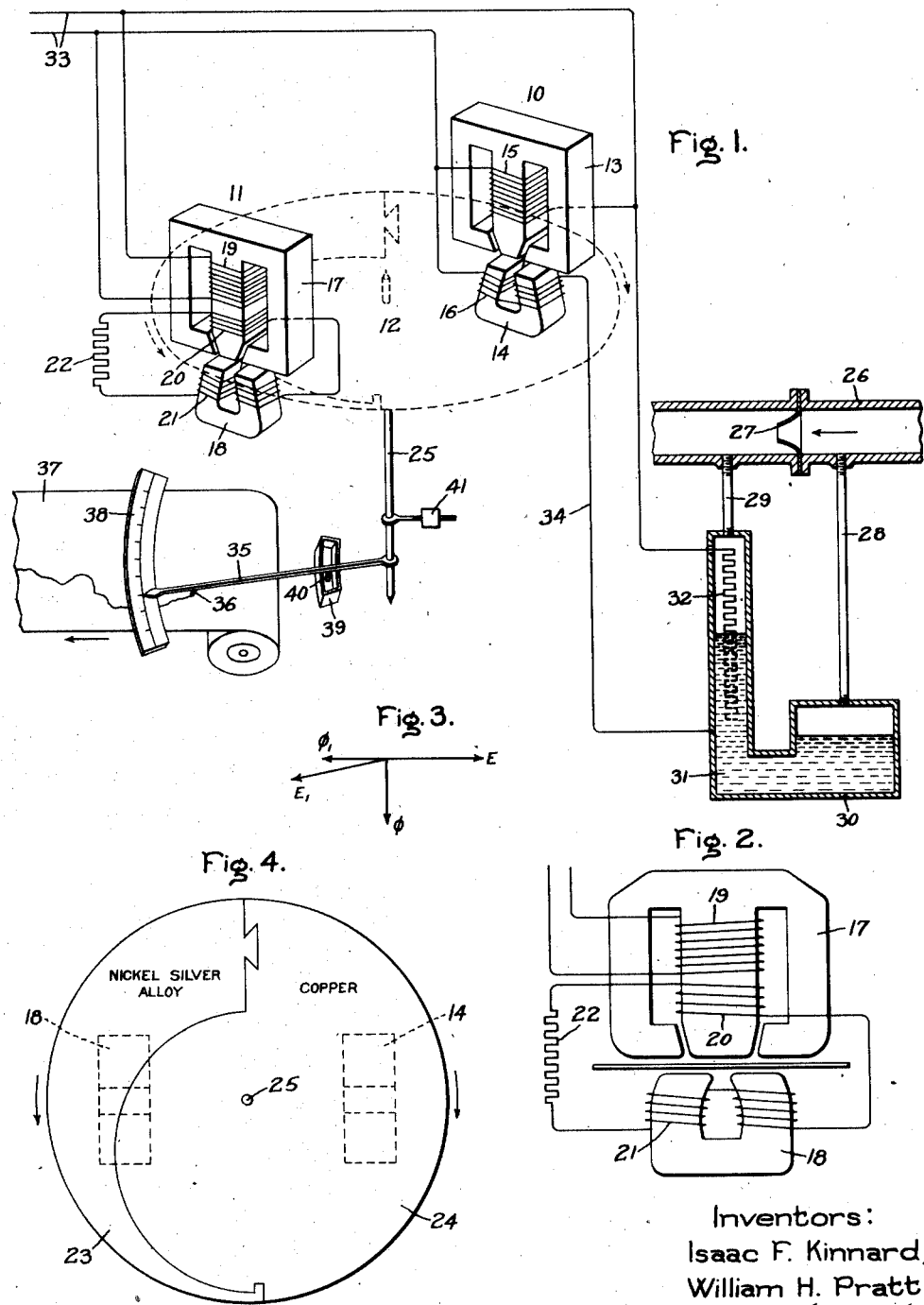
Inventors:
Isaac F. Kinnard,
William H. Pratt,
by *Alexander S. ...*
Their Attorney.

Patented Feb. 14, 1928.

1,659,549

UNITED STATES PATENT OFFICE.

ISAAC F. KINNARD, OF LYNNFIELD, AND WILLIAM H. PRATT, OF LYNN, MASSACHUSETTS, ASSIGNORS TO GENERAL ELECTRIC COMPANY, A CORPORATION OF NEW YORK.

ELECTRICAL MEASURING INSTRUMENT.

Application filed July 12, 1926. Serial No. 121,889.

Our invention relates to electric measuring instruments and devices, including relays, and in particular to an electric measuring device of the induction type for measuring characteristics of alternating current circuits, such, for example, as the conductance.

The particular application of our invention hereinafter described is essentially a ratio measuring instrument in which two induction torque producing elements act in opposition on a movable armature member arranged in such a way that the torque ratios vary as the armature is moved until the torques balance.

In such an instrument the position of the armature is controlled by the instrument torque ratios as distinguished from an instrument torque acting against a return spring so that a return spring is ordinarily unnecessary. The invention relates to improvements in this type of instrument and to an improved torque producing element applicable to electric measuring instruments and meters generally. The invention, as hereinafter described is applied to an electric flow meter installation to which it is particularly suited, but we desire to have it understood that the invention is not limited in this respect.

The features of our invention which are believed to be novel and patentable will be pointed out in the claims appended hereto. For a better understanding of the invention, a particular application of our invention will now be described in connection with the accompanying drawing, in which Fig. 1 represents the device of the invention as used to measure, indicate and record the flow of a fluid through a conduit; Fig. 2 represents a face view of the improved torque producing element shown at the left in Fig. 1; Fig. 3 is a vector diagram of the fluxes of the element of Fig. 2; and Fig. 4 is a plan view of the armature member indicated in dotted lines in Fig. 1.

Referring to the drawings, we have shown in Fig. 1 a ratio instrument comprising two induction meter elements 10 and 11 acting in opposition upon an armature 12 comprising a disc of conducting material so arranged as to vary the torque ratio for different positions of the armature. The armature is mounted at its center upon a suitable shaft 25. The meter element 10 comprises a potential electromagnet 13 and a current electromagnet 14, the coils of which are indicated by numerals 15 and 16, respectively. This element is similar to a well known type of induction wattmeter element, and the joint fluxes produced by the two electromagnets thereof act upon the disc armature 12 to produce a torque in the direction indicated by the arrow adjacent thereto. At a given power factor, this torque is proportional to EI where E represents the voltage applied to the potential coil and I the current flowing in the current coils.

The induction meter element at 11 is arranged in this instance to produce a torque proportional to $E^2$ and comprises electromagnets 17 and 18. The core members of these electromagnets are substantially similar to those at 13 and 14, but the coil of 18 is energized in a novel manner. The electromagnet 17 has a primary potential winding 19 thereon and a secondary winding 20, and serves the additional purpose of a transformer. This secondary winding is connected in series with a winding 21 on the core of electromagnet 18.

This arrangement is better illustrated in Fig. 2. The arrangement makes the fluxes of both electromagnets 17 and 18 proportional to the voltage E applied to winding 19 and the transformer arrangement produces the necessary phase relation between these fluxes so as to produce a torque on the armature proportional to $E^2$. A resistance 22 is preferably included in the circuit of coils 20 and 21 to make the current in coil 21 more nearly of the desired phase, and may have a zero temperature coefficient of resistance to reduce temperature errors. The phase relation of the fluxes produced by coils 19 and 21 may be represented as in Fig. 3, where vector E may represent the primary voltage and $\varphi$ the flux produced by coil 19. The voltage $E_1$ produced by transformer action and impressed upon coil 21 is approximately 180° out of phase with respect to E, and since the circuit of this coil is relatively low in inductance and high in resistance, the flux produced thereby is nearly in phase with the voltage $E_1$ and may be represented by $\varphi_1$. It is seen that $\varphi$ and $\varphi_1$ have substantially a 90° relation, which is the maximum torque producing phase relation for this type of meter element. The resistance 22 is not essential, but is desirable. By making the resistance 22 of a material having a negligible or zero temperature coefficient of resistance, errors due to changes in temperature are reduced. It is seen that the flux relation of the two electromagnets of element 11 are such as to produce a torque proportional to said fluxes, or proportional to $E^2$, and its direction is such as to oppose the torque of element 10 as indicated by the arrow adjacent the left of the armature. It will be apparent that a torque proportional to $E^2$ might be produced by an ordinary shaded coil potential element such as is used in the usual induction disc motor; however, the torque element as represented in Figs. 1 and 2 is preferable because of its higher torque.

The preferred armature construction is best shown in Fig. 4, where it is seen that the armature is made up of two parts 23 and 24 of irregular shape but keyed together and forming a continuous circular balanced disc armature. The part 23 is in this instance made of higher resistance than the part 24; for example, part 23 may be made of a nickel silver alloy and the part 24 of copper.

In the present arrangement the disc is positioned so that the part 23 has its normal range of movement opposite torque element 11, the electromagnet 18 of which is indicated in dotted lines in Fig. 3, and so that the torque element 10, the electromagnet 14 of which is indicated in dotted lines, acts entirely on the lower resistance part 24. The high resistance part 23 has the general shape of a curved horn, as shown, with an outer curvature of a true circle corresponding to the curvature of the circular disc, so that as the disc is rotated with respect to element 11, the resistance of the armature acted upon thereby varies from a minimum when the large portion of the part 23 is opposite element 11, to a maximum when the small portion of part 23 is opposite element 11. In the first position mentioned the fluxes of element 11 act entirely or practically so on the high resistance part 23, and the torque thereof for a given voltage E is comparatively low, and in the last mentioned position the fluxes of element 11 act entirely or substantially so on the lower resistance part 24, and the torque thereof for the same voltage E is materially increased. At intermediate positions the torque has corresponding intermediate values, since the element 11 acts to a varying extent upon both parts of the armature. Thus the torque of element 11 varies with $E^2$ and the position of the armature. Element 10 always acts upon the low resistance part 24 of the armature within the normal range of movement, so that its torque is always proportional to EI. The two torques act in opposition so that a condition of equilibrium will exist when the torque of element 11 represented by $E^2D$, where D is a variable depending upon the deflection, equals the torque of element 10 represented by EI. Thus the deflection D is proportional to $$\frac{EI}{E^2}=\frac{I}{E}.$$

The same result may be obtained by interchanging the torque elements 10 and 11 with respect to the armature, except that the resultant deflection will be in the opposite direction.

We are aware that ratio instruments operating upon the principle of opposing torques one or both of which vary with the deflection are known. However, in such prior instruments the variation due to deflection was produced not by the varying resistance of a continuous mechanically balanced armature, as in the present case, but by cutting away portions of the armature. The present arrangement has the advantage of keeping the armature perfectly balanced in all positions and of a more uniform deflection, since in the present case the complete surface of the pole faces of element 11 are always exposed to and act upon the armature. If the part 23 of the armature of Fig. 4 was removed entirely, the remaining portion of the armature would be analogous to armatures previously used in this class of apparatus. We do not limit our invention to this particular way of making up the circular balanced armature of varying resistance in a circular direction.

The instrument of Fig. 1 is arranged as to measure the flow of fluid in a conduit 26. The conduit contains a pressure creating nozzle 27, and the leading and trailing sides of this nozzle are connected by pipes 28 and 29 to the upper ends of a U tube or chamber 30. It is seen that when flow exists in the conduit in the direction of the arrow therein, a greater pressure will exist in tube 28 than in tube 29, which pressure difference will be proportional to the rate of flow. The high pressure leg of the U tube is larger in area than the low pressure leg, but is not so long. The well formed between the two legs contains a conducting liquid such as mercury 31, so that as a pressure difference is created, due to the flow of the fluid in conduit 26, the mercury lowers in the high pressure leg and rises in the low pressure leg. The low pressure leg contains a resistance element 32 arranged to be connected in series relation with the current coils 16 of the torque element 10 and the source 33 which supplies all of the coils of the instrument either directly or indirectly. When no flow exists, the mercury is at the same level in both legs, and is preferably just out of contact with the lower extremity of resistance element 32. At this time, torque element 11 will rotate the armature to a zero indicating position. The wire 34 between the current coils 16 and the chamber 30 is connected to the metallic surface of the chamber so that it is always in electrical contact with the mercury. As the mercury rises in the low-pressure leg, it first completes the electric circuit of coils 16 and then decreases the resistance in this circuit. At a given voltage E of source 33 the current I in this circuit is proportional to the rate of flow. If the voltage E varies, the current I will vary accordingly for a given rate of flow. Consequently, the conductance of this circuit is proportional to $\frac{I}{E}$ which, as shown above, is the same as the law of deflection of the ratio instrument comprising elements 10, 11 and 12. Consequently, the instrument may be calibrated to indicate, or record, or both indicate and record, the rate of flow in conduit 26 and is independent of wide variations in voltage of the alternating current source 33. A pointer 35 is fixed to the shaft 25 of the instrument. This pointer carries a pen 36 which records the rate of flow on a moving record sheet 37. The pointer also cooperates with a suitable scale 38 to indicate the rate of flow. The pointer may be made hollow so as to provide a capillary passage for the recording liquid from an ink well 39. A tube 40 extends from the pointer into the ink well. The lower end of the tube may be enlarged or carry a vane which then provides suitable damping of the instrument, but in general the high electromagnetic damping is sufficient. The ink well also limits the deflection range of the instrument so that the armature will not get out of place when not in use. An adjustable weight 41 is preferably provided on the shaft opposite the pointer to maintain perfect balance of the rotative parts of the instrument.

While we have specifically described an electric flow meter, it will be evident that the invention includes several points of novelty generally applicable to measuring instruments and meter motors, such as induction relays. As a consequence, we do not wish to limit our invention to any particular application, but seek claims commensurate with the true spirit and scope of the invention.

What we claim as new, and desire to secure by Letters Patent of the United States, is:

1. In combination with an alternating current circuit, a ratio measuring instrument for measuring a characteristic of said circuit comprising a movable member, an induction meter element cooperating with said movable member to produce a torque proportional to the watts of said circuit, a second induction meter element cooperating with said movable member to produce a torque proportional to the square of the voltage of said circuit, said two torques acting in opposition on the movable member which is arranged to vary the ratio of said torques as it is moved to give the instrument a deflection characteristic corresponding to the ratio of the watts to the square of the voltage of said circuit.

2. An alternating current measuring instrument comprising a rotatably mounted armature of conducting material, an induction meter element having current and potential coils for producing a torque on said armature proportional to EI, where I is the current and E is the voltage of the current and potential coils, respectively, a second induction meter element for producing a torque on said armature in opposition to said first mentioned torque which is proportional to $E^2$, said armature being arranged to vary the ratio of said torques as it is moved such as to produce a deflection proportional to $\frac{EI}{E^2}$.

3. In combination with an alternating current source of supply, an impedance device supplied therefrom and means for measuring the conductance of said device comprising a ratio measuring instrument having a movable armature of conducting material, an induction meter element having potential and current coils respectively connected across said source and in series with said impedance for producing a torque on said armature proportional to the product of the potential of said source and the current flowing through said impedance, a second induction meter element supplied from said source and producing a torque on said armature proportional to the square of the voltage of said source, said two torques acting in opposition on said armature, said armature being arranged to vary the ratio of said opposing torques as it is moved so as to produce a balance of said torques at a deflection of the armature proportional to the conductance of said device.

4. In combination with an alternating circuit, a device for measuring a characteristic of said circuit comprising a movable armature of conducting material, an induction meter element cooperating therewith for producing a torque thereon proportional to the watts of said circuit, a second induction meter element cooperating with said armature for producing a torque thereon opposite said first mentioned torque proportional to the square of the voltage of said circuit, said second mentioned element comprising a pair of electromagnets, one of which is energized directly from the potential of said circuit and the other of which is excited from a transformer, which transformer comprises the first mentioned electromagnet and a secondary coil wound thereon.

5. In an electrical measuring device of the induction type, a movable armature of conducting material and an induction meter element comprising a pair of electromagnets located on opposite sides of said armature, one of said electromagnets serving also as the core and primary winding of a transformer having a secondary winding which supplies the energizing winding of the other electromagnet.

6. In an electric measuring device, a pair of alternating current electromagnets each having a core and an energizing winding thereon, a second winding on one of said electromagets, the energizing winding and second winding of said electromagnet comprising the primary and secondary windings of a transformer, said secondary winding being connected in series with and supplying the energizing winding of the other electromagnet, and a resistance having substantially a zero temperature coefficient of resistance in said series connected circuit.

7. In an alternating current electric measuring device of the induction disc type, a movable disc of conducting material and an induction meter element cooperating therewith comprising an electromagnet having an E-shaped core with its open side facing said disc, an electromagnet having a U-shaped core with its open side facing said disc opposite said E-shaped core, said E-shaped core having a secondary winding thereon which supplies the energizing winding of said U-shaped electromagnet.

8. An electrical measuring instrument comprising a movable armature of conducting material and a pair of induction meter elements which cooperate with said armature to produce opposing torques thereon, said armature member comprising a continuous mechanically balanced circular disc made up of a plurality of sections of different resistances which are so shaped and positioned with respect to each other and to said meter elements that the ratio of the torques produced by said elements on said disc changes as the armature is moved.

9. An electrical measuring instrument comprising a continuous circular disc of conducting material, a pair of induction meter elements cooperating with said disc on approximately opposite ends of a diameter thereof for producing opposing torques thereon, the portion of the disc which is adjacent one of said meter elements having a varying resistance over a portion of its circumference such that the disc seeks a position, where the two torques balance, dependent upon the ratio of said torques.

10. In an electric measuring instrument of the induction disc type, an armature member comprising a disc made up of irregular shaped sections of non-magnetic conducting material having different resistances, said sections being secured together to form a continuous circular mechanically balanced disc.

11. In an electric measuring instrument of the induction disc type, an armature member of conducting material made up of two sections having different resistances, one section being cam-shaped, said two sections being keyed together to form a continuous circular disc in which the composite resistance in a circumferential direction varies substantially uniformly over approximately one half of said disc.

12. In an electric measuring instrument of the induction disc type, an armature member comprising a continuous circular mechanically balanced disc of non-magnetic conducting material having a uniformly varying resistance in a circular direction over a substantial portion thereof.

In witness whereof, we have hereunto set our hands this 8th day of July, 1926.

ISAAC F. KINNARD.
WILLIAM H. PRATT.